(12) United States Patent
Housey et al.

(10) Patent No.: US 6,675,648 B2
(45) Date of Patent: Jan. 13, 2004

(54) GEAR ASSEMBLY INCLUDING MAGNETIC CAP WITH ALIGNMENT FEATURE

(75) Inventors: Randal L. Housey, Austin, TX (US); Joseph B. Wieck, Austin, TX (US); Carl A. Taylor, Carrollton, TX (US); Herbert G. Ross, Jr., Argyle, TX (US)

(73) Assignee: Rochester Gauges, Inc., Dallas, TX (US)

( * ) Notice: Subject to any disclaimer, the term of this patent is extended or adjusted under 35 U.S.C. 154(b) by 0 days.

(21) Appl. No.: 10/211,806

(22) Filed: Aug. 2, 2002

(65) Prior Publication Data

US 2003/0106371 A1 Jun. 12, 2003

Related U.S. Application Data

(63) Continuation-in-part of application No. 09/795,233, filed on Feb. 26, 2001, now Pat. No. 6,523,406.

(51) Int. Cl.[7] .......................... G01F 28/32; G01F 23/00; G01R 33/3873
(52) U.S. Cl. ...................... 73/317; 73/290 R; 324/200; 324/207.22
(58) Field of Search .............................. 73/290 R, 305, 73/317; 324/200, 207.22

(56) References Cited

U.S. PATENT DOCUMENTS

| 4,402,209 A | 9/1983 | Di Domenico | 73/1 |
| 4,688,028 A | 8/1987 | Conn | 340/625 |
| 5,305,639 A | 4/1994 | Pontefract | 73/317 |
| 6,041,650 A | 3/2000 | Swindler et al. | 73/317 |
| 6,089,086 A | 7/2000 | Swindler et al. | 73/317 |

FOREIGN PATENT DOCUMENTS

| GB | 1177805 | 1/1970 |

*Primary Examiner*—Hezron Williams
*Assistant Examiner*—Rodney Frank
(74) *Attorney, Agent, or Firm*—Sidley Austin Brown & Wood LLP (57) ABSTRACT

A float-type liquid level gauge assembly is provided for measuring the level of a liquid in a tank. The liquid level gauge includes a gear housing for efficiently coupling the gears and accurately assembling and aligning certain components; a movable pivot arm assembly supporting a float arm assembly; and a gear on the pivot arm assembly coupled with a pinion gear located in the gear housing. The pinion gear has a shaped passageway which accepts a similarly shaped drive shaft. A single piece magnetic cap, which defines a bore correspondingly shaped to accept the shaped drive shaft such that it will not rotate relative to the drive shaft, is installed on the drive shaft. The drive shaft and the magnetic cap each include a positioning feature, such that when the positioning feature of the drive shaft engages the positioning feature of the magnetic cap, the magnetic cap is properly aligned with a magnet in a dial assembly. A float arm with an attached float assembly can be adapted to act as both the float arm and the counterweight for counterbalancing the float assembly.

19 Claims, 10 Drawing Sheets

GEAR ASSEMBLY INCLUDING MAGNETIC CAP WITH ALIGNMENT FEATURE

This is a Continuation-In-Part of U.S. patent application Ser. No. 09/795,233 filed Feb. 26, 2001 now U.S. Pat. No. 6,523,406.

TECHNICAL FIELD OF THE INVENTION

This invention relates broadly to gauges for measuring the level of liquid in a tank; in particular, a float-type liquid level gauge for measuring the level of liquid in a tank containing a liquefied gas. More particularly, this invention relates to single piece magnetic cap with alignment feature for use with a float-type liquid level gauge.

BACKGROUND OF THE INVENTION

This invention relates generally to a liquid level gauge, and more particularly to gauges commonly used for measuring liquefied petroleum gas (LPG) type liquids. The LPG is typically stored as a liquid under pressure in a tank or cylinder. A liquid level gauge may be provided on the tank or cylinder for measuring the level of the liquid.

A typical gauge of this type utilizes a pivoting float arm having a float at one end and an opposing separately attached counterweight at another positioned on a opposing side of a pivot from the float. The pivoting float arm moves in response to changes in the liquid level inside the tank. As the float arm pivots, it rotates a gear assembly which turns a drive shaft located in a support arm that is connected to the float arm. The drive shaft is connected to a tank magnet which is magnetically coupled to a receiving magnet in a gauge head. As the drive shaft rotates and rotates the tank magnet, the magnetic flux of the tank magnet rotates the receiving magnet which moves an external liquid level visual indicator, such as a pointer on a dial. Examples of such gauges are disclosed in U.S. Pat. Nos. 6,089,086 and 6,041,650.

In assembling these gauges, it is necessary to align the tank magnet on the end of the drive shaft with a base position of the float arm so that accurate readings will be transferred to the dial assembly. It is important that when the gears connected to the drive shaft in the support arm and the gears connected to the float arm are attached, they are attached at such a position that the tank magnet is aligned to provide an accurate reading of the level of liquid in the tank. Previously, this alignment was done manually by rotating a round drive shaft until the position of the tank magnet on the drive shaft corresponded to the given location of the float arm. At that point, the drive shaft was staked to the gear, permanently attaching the gear to the drive shaft and ensuring that the alignment of the magnet did not change. Further, the magnet needs to be installed in and secured to a magnet holder or other attachment device prior to the magnet holder being secured to the drive shaft in the support arm. The extra step of assembling the magnet and the magnet holder add extra work in the installation and potentially create an opportunity for inaccuracy in alignment and incorrect readings. Additionally, attaching a separate counterweight piece to the float arm requires an additional assembly step and an accurate determination of size, weight, and positioning so as to provide the proper balance to the float arm.

Not surprisingly, there are problems with this assembly. Improper alignment of the magnet in the magnet holder can reduce the accuracy of the gauge. Further, it takes time to align the tank magnet to the corresponding position of the float arm. Even then, the accuracy could be compromised if the drive shaft was inadvertently turned before or while the stake is being inserted.

There is a continuing need for a gauge that can be assembled more efficiently and with reduced risk of error in the proper alignment of the magnet. In view of this need, this invention provides for a gauge that can be aligned in a trouble free and accurate way, allowing assembly to be more efficient.

SUMMARY OF THE INVENTION

In accordance with one aspect of the current invention, a linkage is provided including a pinion gear, a second gear, and a gear housing. The pinion gear, located in the passageway of the first portion of the gear housing, has a pinion gear neck and an engaging means. The second gear, rotatably attached to the second portion of the gear housing, also has engaging means which mesh with the engaging means of the pinion gear.

In another aspect of the current invention, a linkage is provided comprising a pinion gear, a second gear and a gear housing. In this aspect of the invention, the pinion gear has a pinion gear neck, pinion gear teeth, and a pinion gear nose. The first portion of the gear housing has a passageway for insertion of the pinion gear neck as well as an appendage, such as a support arm. The second portion of the gear housing has a slot to allow the pinion gear teeth unencumbered rotation. The second portion of the gear housing also has a notch for the pinion gear nose to rotate freely. The second gear is rotatably attached to the second portion of the gear housing and the engaging means of the second gear mesh with the teeth of the pinion gear.

In yet another aspect of the current invention, an apparatus for use with a liquid level gauge is provided. The apparatus comprises a pinion gear, a second gear, and a gear housing. The pinion gear neck defines a shaped passageway to accommodate a similarly shaped drive shaft. The pinion gear neck is inserted into a recess in the passageway in the gear housing. As an additional feature, the neck of the pinion gear could be longer than the recess so the pinion gear is more secure in the gear housing. A bushing could also be inserted into the passageway so as to further stabilize the pinion gear. In a further embodiment, the second gear has a nose that is inserted into a receiving passage of the gear housing as a way to rotatably attach the second gear to the gear housing. An alternative could be for the gear housing to have a nose that is inserted into a passage on the second gear. The second gear could also be adapted for use as part of a pivot arm assembly.

In yet another aspect of the current invention, a drive shaft assembly is presented. The drive shaft assembly comprises a drive shaft which has a positioning feature. This positioning feature limits the number of ways the drive shaft can fit into the passageway in the neck of the pinion gear. A magnet holder and a magnet are located on the end of the drive shaft opposite the end that is inserted into the pinion gear neck.

In a still further embodiment, a liquid level gauge is provided including a gauge head, a support arm, a gear housing, a drive shaft assembly, a pivot arm assembly, and a tank magnet. The pivot arm assembly is rotatably connected to the gear housing. The gear housing is attached to the lower end of the support arm and the gauge head is connected to the upper end of the support arm. An internal passageway for insertion of the drive shaft is located in the support arm and continues into the lower portion of the gauge head. In a further embodiment, the drive shaft can be of variable length so different length support arms can be utilized. The tank magnet is attached to the upper end of the drive shaft assembly inside the gauge head. Angular motion of the pivot arm relative to the support arm imparts rotational motion to the drive shaft via the gears, and thus to the tank magnet attached to the drive shaft. In a further embodiment, the pivot arm assembly can also include a counterweight arm and a separately attached counterweight positioned at an opposing end and on an opposing side of the pivot from the float arm and float. However, it is conceivable that the counterweight arm itself could act as the counterweight providing proper balance without need for a separately attached counterweight.

In yet another aspect of the invention, a single piece magnetic cap having an alignment feature to insure that the tank magnet and the dial magnet are quickly and accurately aligned in a predetermined arrangement. The magnetic cap defines a bore shaped to accept a shaped drive shaft. The magnetic cap further includes an alignment feature corresponding to an alignment feature on the shaped drive shaft. When drive shaft is properly installed within the bore of the magnetic cap, the alignment feature on the drive shaft engages the alignment feature of the magnetic cap thereby preventing rotation of the magnetic cap with respect to the drive shaft and thereby providing the predetermined alignment of the magnetic cap (tank magnet) with respect to the dial magnet. The magnetic cap is preferably molded from a ferritic material, such as ferrite powder, and a durable medium, such as nylon. The single piece magnetic cap can be quickly and inexpensively formed in any desirable shape, size, or configuration and formed to accommodate attachment to any shape or dimension shaft. The engaging portion of the drive shaft could be an engaging edge, a protrusion or a groove which would correspond to an accepting portion within the bore of the magnetic cap.

BRIEF DESCRIPTION OF THE DRAWINGS

A more complete understanding of the invention and its advantages will be apparent from the following detailed description when taken in conjunction with the accompanying drawings in which:

FIG. 7b is a cross section of a pinion gear designed to be used with the gear housing in FIG. 7a;

FIG. 14b is another side view of the one exemplary embodiment of the float arm and counterweight system combination shown in FIG. 14a;

DETAILED DESCRIPTION

Referring now to the drawings wherein like referenced characters designate like or corresponding parts throughout the several views, a preferred embodiment of the liquid level gauge of the present invention is illustrated along with a preferred embodiment of a molded magnet for use with a liquid level gauge.

Figures 1, 2A, 2B:
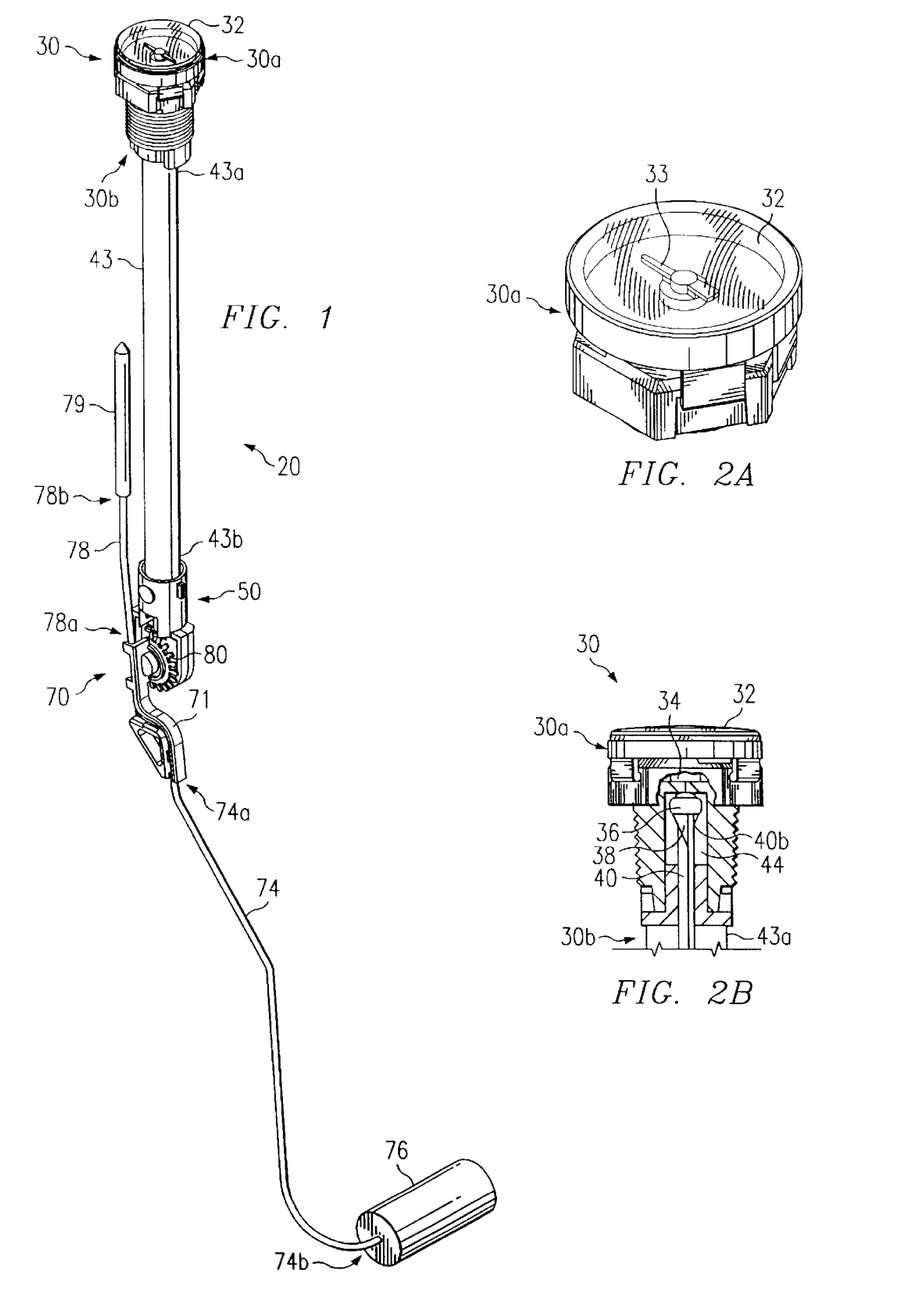
FIG. 1 is a perspective view of a preferred embodiment of the liquid level gauge.
FIG. 2a is a perspective view of the upper portion of the gauge head having a dial assembly.
FIG. 2b is a side view of the gauge head A portion of the gauge head is broken away to show the internal components.

Referring first to FIG. 1, liquid level gauge 20 comprises a gauge head 30, having an upper portion 30a and a lower portion 30b. The upper portion 30a accepts a dial assembly 32 (see FIG. 2a) and the lower portion 30b is connected to a first end 43a of the support arm 43. A second end 43b of the support arm 43 is connected to a gear housing 50. There is a drive shaft passageway 44 that extends from the second end 43b of the support arm 43, through the first end 43a of the support arm 43 and into the lower portion 30b of gauge head 30 (see FIGS. 2b and 3). A pivot arm assembly 70 is rotatably connected to the second portion 50b of gear housing 50. The pivot arm assembly 70 comprises a second gear 80 and an arm attachment portion 71. A first end 74a of a float arm 74 is attached to the arm attachment portion 71. A float 76 is attached to a second end 74b of the float arm 74 In a preferred embodiment, a counterweight 79 is attached to a second end 78b of a counterweight arm 78. The first end 78a of the counterweight arm 78 is attached to the arm attachment portion 71 of the pivot arm assembly 70 It will be appreciated that the float arm 74 can be a single piece, as is known in the art. Also, as is known in the art, counterweights in some designs are not required. Thus, the illustration of a specific design with respect to the float arm is not limiting.

Figures 3, 4:
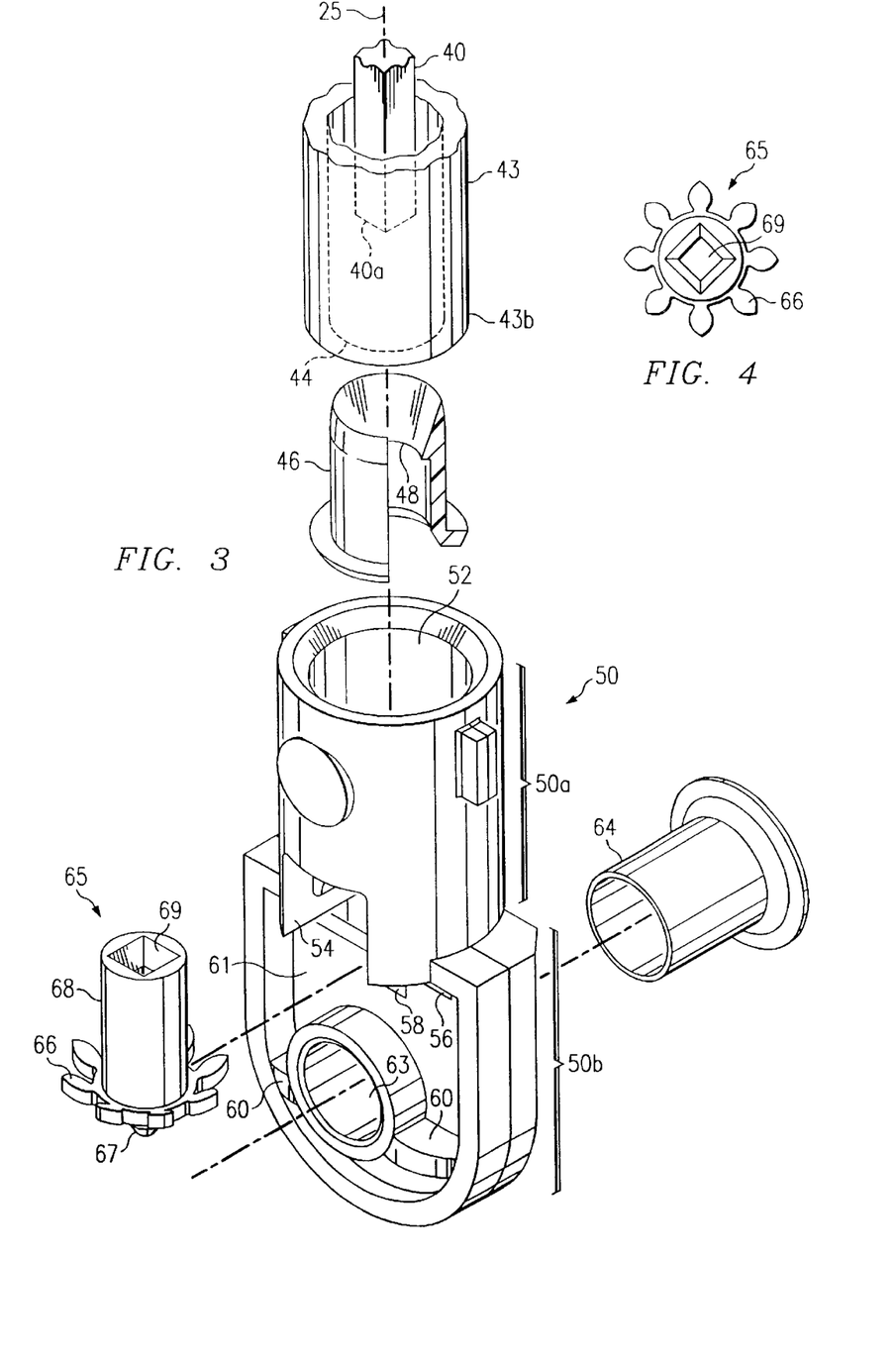
FIG. 3 is a perspective view of a preferred embodiment of the gear housing, pinion gear, bushings, support arm and drive shaft.
FIG. 4 is a top view of a preferred embodiment of the pinion gear.

As can be seen in FIG. 2b, there is a drive shaft passageway 44 that extends from the second end 43b of the support arm 43, through the first end 43a of the support arm 43 and into the lower portion 30b of gauge head 30 (see FIGS. 2b and 3). A magnet holder 38 is attached to the second end 40b of the drive shaft 40. In a preferred embodiment, the magnet holder 38 is formed integrally with the drive shaft 40. But, the magnet holder 38 could be attached to the drive shaft 40 by any means known in the art. A tank magnet 36 is placed in the magnet holder 38. In a preferred embodiment, the tank magnet 36 is a cylindrical magnet, but any type of magnet could be used, such as a donut magnet or a bar magnet. A receiving magnet 34 is located in the gauge head 30. As the drive shaft 40 rotates, the tank magnet 36 rotates with the drive shaft 40. The magnetic flux of the tank magnet 36 causes the receiving magnet 34 to rotate, which causes an indicator in the dial assembly 32 to move. In a preferred embodiment, the indicator in the dial assembly 32 is a pointer 33, as seen in FIG. 2a.

Figure 7A:
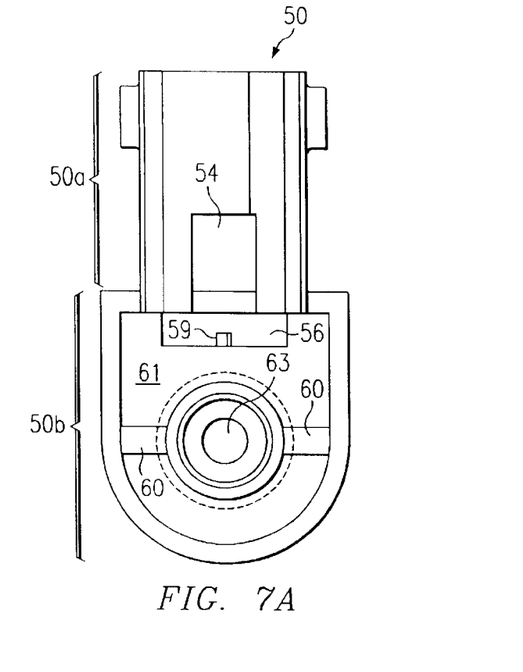
FIG. 7a is a front view of an alternative gear housing containing a pinion pin.
Figure 7B:
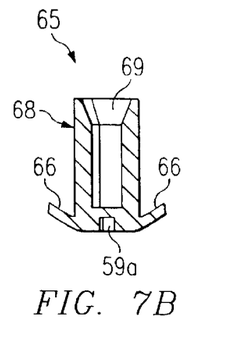

As can be seen in FIG. 3, the gear housing 50 has two portions, the first portion 50a and the second portion 50b. The first portion 50a defines a passageway 52 located along the axis 25 shown in FIG. 3. There is a recess 54 in the passageway 52 for insertion of a pinion gear 65, more specifically, the pinion gear neck 68. The pinion gear neck 68 is inserted into the recess 54 of the passageway 52 and the pinion gear teeth 66, fit into the pinion gear tooth slot 56. The pinion gear teeth 66 are free to revolve in the pinion gear tooth slot 56, located in the second portion 50b of the gear housing 50. The pinion gear tooth slot 56 is operatively adjacent to the recess 54. In a preferred embodiment, the pinion gear 65 includes a pinion gear nose 67. The pinion gear nose 67 is free to rotate in the pinion gear nose notch 58 located in the second portion 50b of the gear housing 50 (see FIG. 7d). The pinion gear nose 67 allows for easy assembly and smooth movement of the pinion gear 65. Alternatively, as shown in FIGS. 7a and 7b, the pinion gear tooth slot 56 could contain a pin 59 protruding from the pinion gear tooth slot 56 and the pinion gear 65 could have a receiving portion 59a for this pin. Also, in a preferred embodiment, the pinion gear neck 68 is longer than the recess 54 to further secure the pinion gear 65 in the passageway 52.

In a preferred embodiment, after the pinion gear 65 is inserted into the gear housing 50, a bushing 46 may be inserted into the passageway 52 for further stabilization of the pinion gear 65. This bushing 46 is not required but it helps with ensuring vertical alignment of the pinion gear 65. In a further embodiment of the bushing 46, the bushing 46 could have an internal ledge 48 for the pinion gear neck 68 to rest upon.

The second end 43b of the support arm 43 is inserted into passageway 52 in the first portion 50a of gear housing 50. The pinion gear neck 68 defines a pinion gear neck passageway 69 which is shaped to receive a similarly shaped drive shaft 40. A top view of the pinion gear 65 is shown in FIG. 4. The shape of the drive shaft 40 (which is a positioning feature) limits the number of ways the drive shaft 40 can be inserted into the pinion gear neck passageway 69. In a preferred embodiment, the shape of the drive shaft 40 is square but the drive shaft 40 could be any shape which allows it to be rotated by movement of the pinion gear. Preferably, there are an even number of sides. Limiting the number of ways the drive shaft 40 can be positioned in the pinion gear neck passageway 69 is an important aspect of the invention. For example, when the drive shaft 40 is square and the gears and the magnet holder 38 are both at the correct angular position when the square shaft 40 is inserted into the pinion gear neck passageway 69, the magnet 36 can only be oriented in two positions in the holder 38. The magnet 36 is magnetized along its cylindrical axis with a north and south pole. This allows the assembler to quickly determine the correct orientation of the magnet 36 in the magnet holder 38 by checking the indication of the dial assembly 32 relative to the position of the float arm 74.

Figure 5:
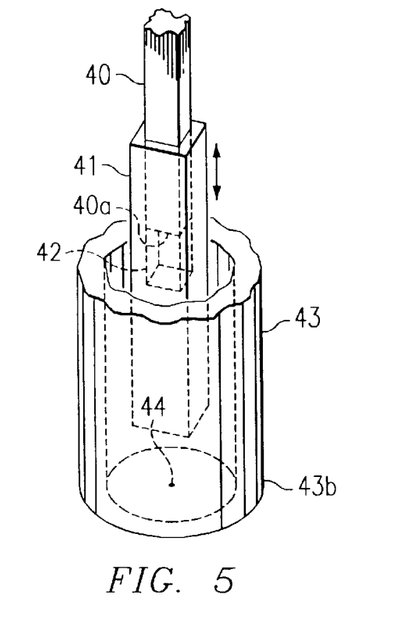
FIG. 5 is a perspective view of an alternative drive shaft, which is an extendable length drive shaft.

FIG. 5 shows a drive shaft 40 which also includes a second drive shaft 41. The second drive shaft 41 defines a passageway 42 in which the first end 40a of drive shaft 40 fits into. This allows for the drive shaft 40 to be extendable, thus allowing the same materials to be used with different length support arms 43.

Figure 6:
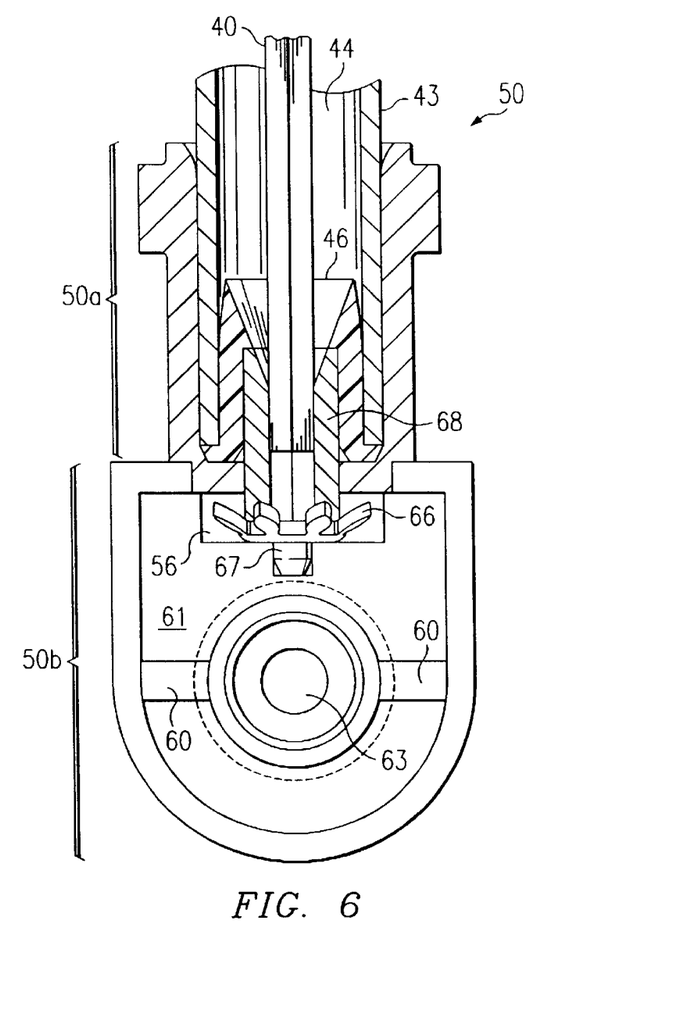
FIG. 6 is a cross-section view of the gear housing with the pinion gear, drive shaft, and alignment bushing in place.
Figure 7C:
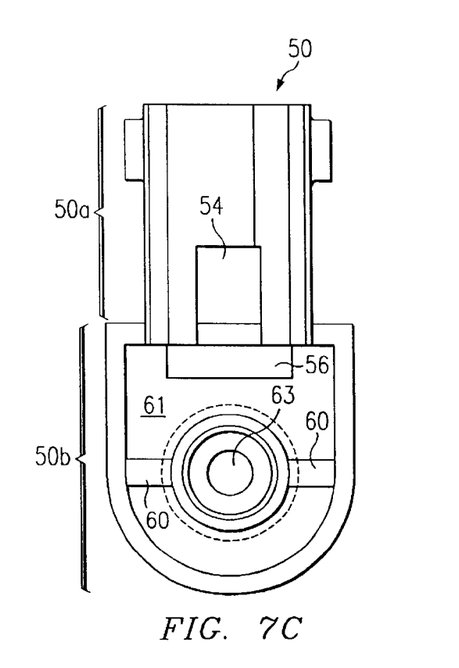
FIG. 7c is a front view of an alternative gear housing to receive a pinion gear with no pinion gear nose.
Figure 7D:
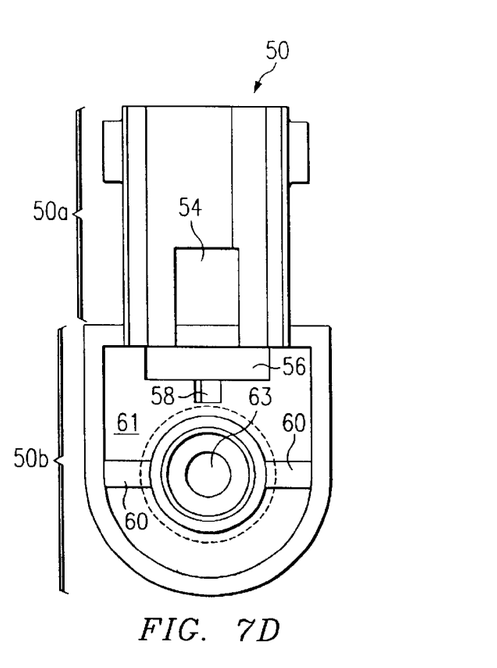
FIG. 7d is a front view of a preferred embodiment of the gear housing, including a pinion gear nose notch.

FIG. 6 shows a cross-sectional view of the pinion gear 65, the bushing 46, the drive shaft 40, and the support arm 43 inserted into the gear housing 50. FIGS. 7a, 7c, and 7d show alternative gear housings 50. FIG. 7a shows a gear housing 50 with a pinion gear pin 59 to hold the pinion gear 65 in place. FIG. 7b shows a cross sectional view of a pinion gear 65 that could be used with the gear housing 50 shown in FIG. 7a. The pinion gear 65 has a receiving passageway 59a to receive the pinion gear pin 59. FIG. 7c shows a gear housing 50 designed for a pinion gear 65 that does not have a pinion gear nose 67. A preferred embodiment is shown in FIG. 7d where the gear housing 50 includes a pinion gear nose notch 58.

Figure 8:
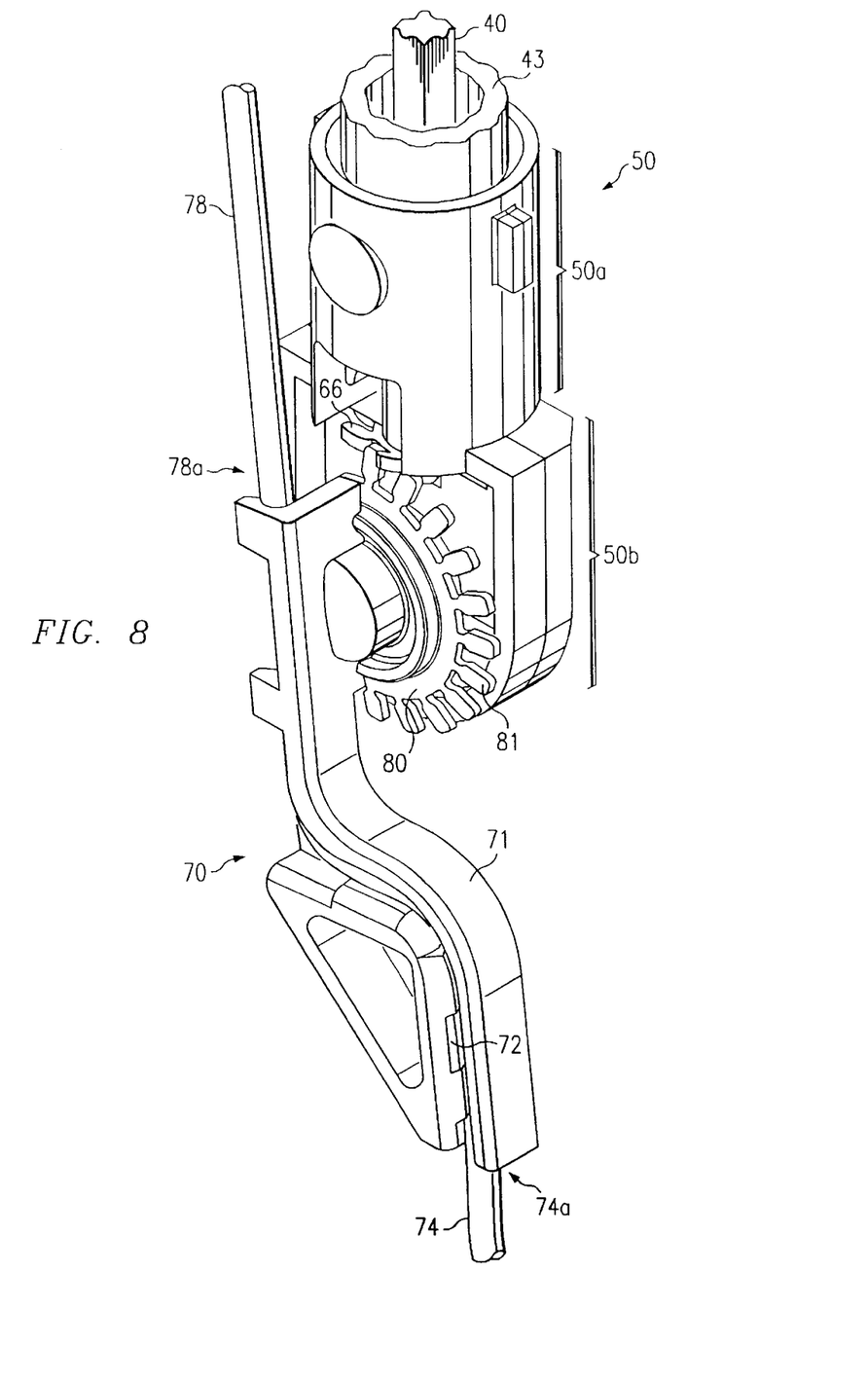
FIG. 8 is a perspective view of the pivot arm assembly inserted in the gear housing.
Figure 9A:
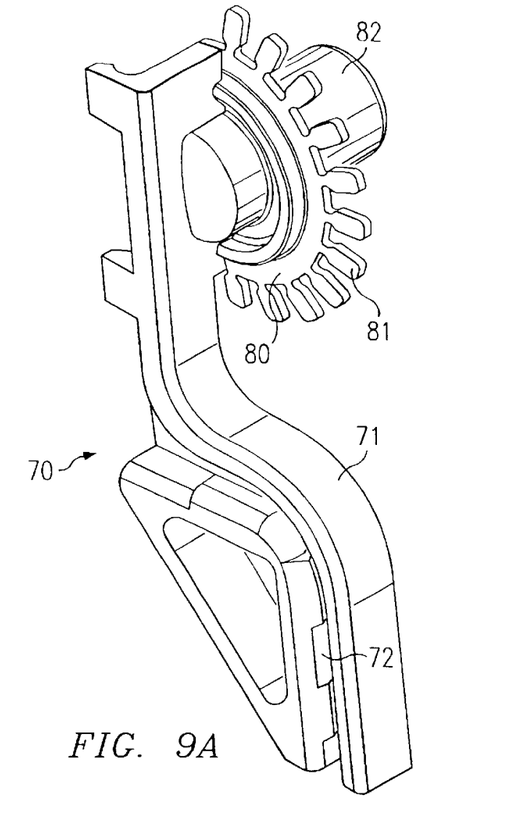
FIG. 9a is a perspective view of the front of the pivot arm assembly.
Figure 9B:
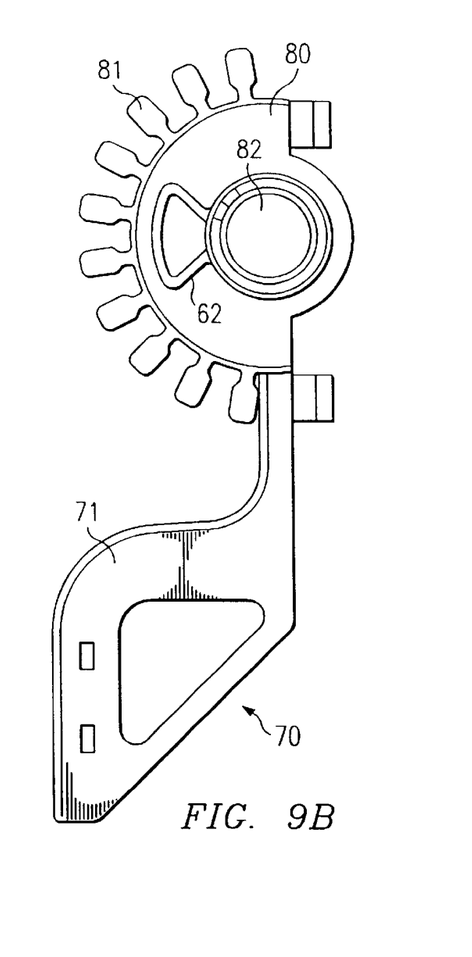
FIG. 9b is a perspective view of the back of the pivot arm assembly.
Figure 10:
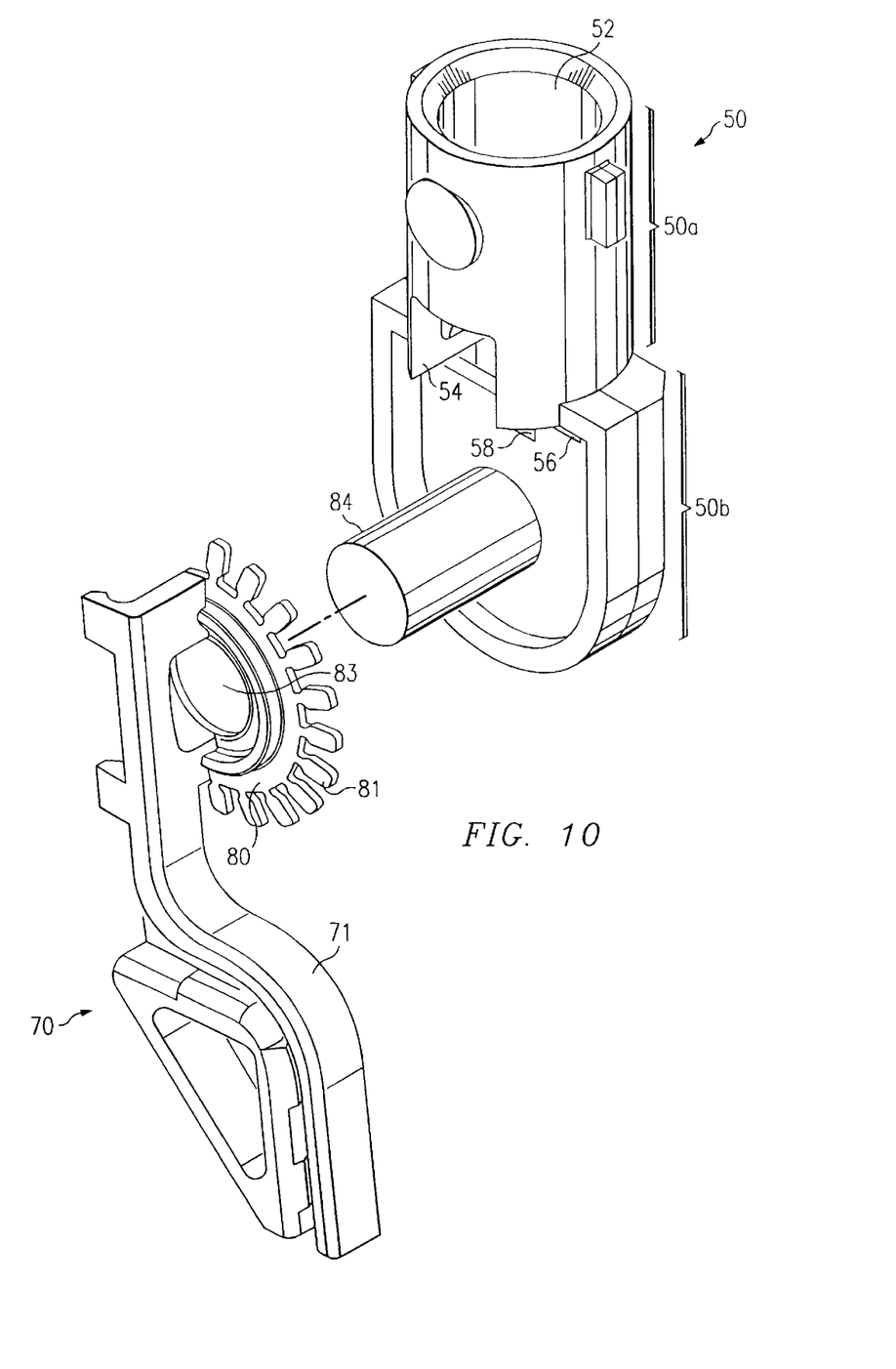
FIG. 10 is a perspective view of an alternate way of attaching the second gear to the gear housing.

As shown in FIG. 8, a pivot arm assembly 70 is rotatably connected to the second portion 50b of the gear housing 50. The pivot arm assembly 70 comprises a second gear 80 and an arm attachment portion 71. The pivot gear assembly 70 can be rotatably attached to the gear housing 50 in many ways. A preferred embodiment is shown in FIGS. 9a and 9b where the second gear 80 has a second gear nose 82 that is inserted into the second portion receiving passage 63 (See FIG. 3). FIG. 10 shows another alternative where the second gear 80 has a second gear receiving passage 83 that receives a second gear pin 84 which is located on the gear housing 50. As shown in FIG. 3, a bushing 64 can be inserted in the second portion receiving passage 63 to further secure the pivot arm assembly 70 to the gear housing 50. Instead of a bushing, a screw or a stake or a pin are just a few examples of alternatives that could be used.

When the pivot arm assembly 70, and hence the second gear 80, are attached to the gear housing 50, the engaging means of the second gear 81 mesh with the engaging means of the pinion gear teeth 66. In a preferred embodiment, the engaging means are gear teeth, but any engaging means known in the art could be used without deviating from the invention.

The arm attachment portion 71 of the pivot arm assembly 70 can be used to attach a float arm 74 and a float 76. The first end 74a of the float arm 74 is attached to the arm attachment portion 71 and held in place by at least one fastening member 72. A few examples of fastening members are stakes, screws, ties, clips, spring clips, pretensioned members, adhesive, as well as any means known in the art. The float 76 is attached to the second end 74b of the float arm 74 by any means known in the art. A float of any shape can be used without deviating from the present invention.

In a preferred embodiment, a counterweight arm 78 is also utilized. A first end 78a of the counterweight arm 78 is attached to the arm attachment portion 71. A counterweight 79 is attached to a second end 78b of the counterweight arm 78.

Referring to FIGS. 1 and 14a–14d, in a second preferred embodiment, the counterweight arm 78 and the float arm 74 of the pivot arm assembly 70 are integrally formed as a single piece arm structure 73 with a counterweight portion 179 at one end 78b and a float portion 176 having a float 76 attached at an opposite end 74b from the counterweight portion 179. The single piece float/counterweight arm structure 73 is preferably an elongate shaft having a pivot point 170 which is formed substantially at a position of balance of the counterweight portion 179 and the float portion 176. The arm structure 73 preferably has a bent portion 171 positioned on the float side of the pivot point 170. The bent portion 171 is adapted to be secured to the pivot arm assembly 70 of the liquid level gauge 20 by insertion into a similarly bent and shaped arm attachment portion 71 such that the pivot arm assembly 70 pivots about the pivot point 170 as the second gear 80 rotates. However, other designs and shapes of the arm attachment portion 71 of the pivot arm assembly 70 and thereby the corresponding bent portion 171 could be designed to perform the desired securing and pivoting operation.

Alternately, referring to FIGS. 14a–14d, the counterweight portion 179 of the structure 73 could include a counterweight arm 78 which is extended in length and having a counterweight portion 179 which is bent back upon itself to provide the additional mass required to act as a counterweight and properly balance the pivot arm assembly 70 thereby eliminating the need for a separately attached counterweight. Hook feature 180 at an end 182 of the counterweight portion 179 allows the bent back portion of the counterweight portion 179 to be clasped back and secured onto itself just prior to installation. This design allows the extended counterweight portion 179 to be more consistent from unit to unit, prevents snagging upon installation, and provides a lead-in feature to ease assembly. While the counterweight portion 179 is shown with only one bend, any number of bends can be formed in any shape, form, or combination thereof, so long as the unit is able to fit through a tank opening. The bends can be formed by any means now know or later developed.

When the liquid level gauge 20 is inserted in a tank, the float 76 is partially submerged in the liquid. The float 76 is supported by the buoyant force of the liquid. As the level of the liquid within the tank changes, the float 76 and the float arm 74 can move throughout an arc until the stop surfaces 60, located on the gear housing 50, are reached by the stop 62 located on the second gear 80 (see FIGS. 7a, 7c, 7d and 9b). The area between the stop surfaces 60 is a keyway 61, allowing the second gear 80 to move in a predetermined arc, relative to the gear housing 50. The movement of the float arm 74 causes the second gear 80 of the pivot arm assembly 70 to move. This imparts rotary motion onto the pinion gear 65 which moves with the drive shaft 40.

Rotation of the drive shaft 40 causes corresponding motion of the magnet 36 which is fixed to the second end 40b of drive shaft 40 by a magnet holder 38. The rotation of the magnet 36 causes the magnetic field of the magnet 36 to move, causing a corresponding movement of the receiving magnet 34 and a pointer 33 to indicate the level of liquid in the tank. In a preferred embodiment, the dial assembly 32 includes a pointer 33 to indicate the level of the liquid being measured. Any visual indicator could be used without deviating from this invention.

One way to assemble a preferred embodiment of the liquid level gauge 20 is to insert the pinion gear 65 into the pinion recess 54 in the passageway 52 of the upper portion 50a of the gear housing 50. The pinion gear teeth 66 fit into the pinion gear tooth slot 56 and the pinion gear nose 67 rests in the pinion gear nose notch 58, both located in the second portion 50b of the gear housing 50. Insert the first end 40a of the drive shaft 40 into the pinion gear neck passageway 69. The tank magnet 36 is attached to the second end 40b of the drive shaft 40. For further support of the pinion gear 65, insert a bushing 46 into passageway 52. The support arm 43 can be inserted into passageway 52 either before or after the drive shaft 40.

The gauge head 30, including the dial assembly 32 and the receiving magnet 34, can be attached to the first end 43a of support arm 43 either before or after the pivot arm assembly 70, including the second gear 80, is rotatably attached to the second portion 50b of the gear housing 50.

When the pivot arm assembly 70 is rotatably attached to the second portion 50b of the gear housing 50, align the tank magnet 36 to one of two possible positions so the reading of the dial assembly 32 corresponds to the position of the float arm 74. The alignment can be made by rotating the pinion gear 65 which in turn rotates the drive shaft 40. Depending on when the gauge head 30 is attached to the support arm 43, the alignment could be made by turning the drive shaft 40 directly. When the position of the float arm 74 corresponds to the reading on the dial assembly 32, insert a bushing 64 into the back of the second portion 50b of the gear housing 50 to secure the second gear 80, which is on the pivot arm assembly 70.

While a dual-piece tank magnet 36 and magnet holder 38 assembly for use with the gear assembly for a tank liquid level gauge as described above is functional and effective, such a magnet assembly requires numerous steps to properly assemble and install. Further, the entire magnetic assembly must be properly aligned during installation in order to calibrate the tank magnet 36 with the gauge head dial magnet 38 for a correct reading to be measured by the gauge. According to another embodiment illustrated in FIGS. 11A–11D and FIGS. 12 and 13, a magnetic cap with alignment feature for use with a gear assembly is shown. The single piece magnetic cap 200 is adapted to be used with a drive shaft 40 having a shaped cross-section and/or a positioning feature 40b, such that a magnetic portion 204 of the magnetic cap 200 is automatically properly aligned with the receiving magnet 34, and the magnetic cap 200 is automatically properly aligned with the drive shaft 40 upon installation.

According to the preferred embodiment, the magnetic cap 200 is designed to be attached directly to a drive shaft 40 of a gear assembly for a tank liquid level gauge assembly 20, such as was illustrated in FIG. 1. The magnetic cap 200 of this embodiment, is formed as a single piece incorporating a securing portion or body portion 202, a magnetic portion 204, and a bearing portion 214. Preferably, the body portion 202, the magnetic portion 204, and the bearing portion 214 are integrally formed as a single unit from a composite or combination of a ferrous material and a sturdy base material. However, other suitable materials may be substituted for the ferrous material. The magnetic portion 204 of the single piece magnetic cap 200 is preferably shaped as a bar or rod having a first end 206 and a second end 208. The magnetic portion preferably extends perpendicularly to the body portion 202 with the first end 206 and second end 208 each extending equidistantly outward from the body portion 202. The magnetic portion 204 of the single piece magnetic cap 200 is preferably polarized during formation of the molded magnetic cap such that one of the first end 206 and the second end 208 of the magnetic portion 204 has a positive magnetic charge and the other end has a negative magnetic charge. One skilled in the art would understand that other designs and arrangements could be adapted for use in this device as well For example, the shape of the body portion 202 could be identical to the shape of the magnetic portion 204 such that no visible distinction could be made between the two portions.

Figure 11A:
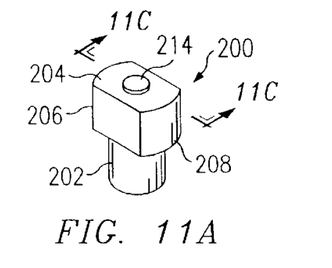
FIG. 11A is a perspective view of one exemplary embodiment of a single piece molded magnetic cap.
Figure 11B:
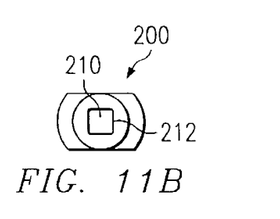
FIG. 11B is a bottom view of the one exemplary embodiment shown in FIG. 11A.
Figure 11C:
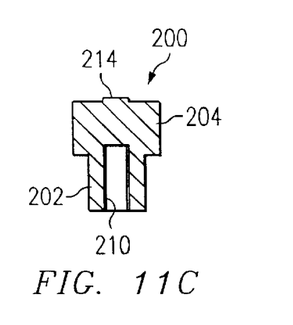
FIG. 11C is a cross-sectional view of the one exemplary embodiment shown in FIG. 11A taken along section line 11C—11C of FIG. 11A.
Figure 11D:
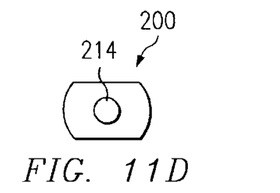
FIG. 11D is a top view of the one exemplary embodiment shown in FIG. 11A.
Figure 12:
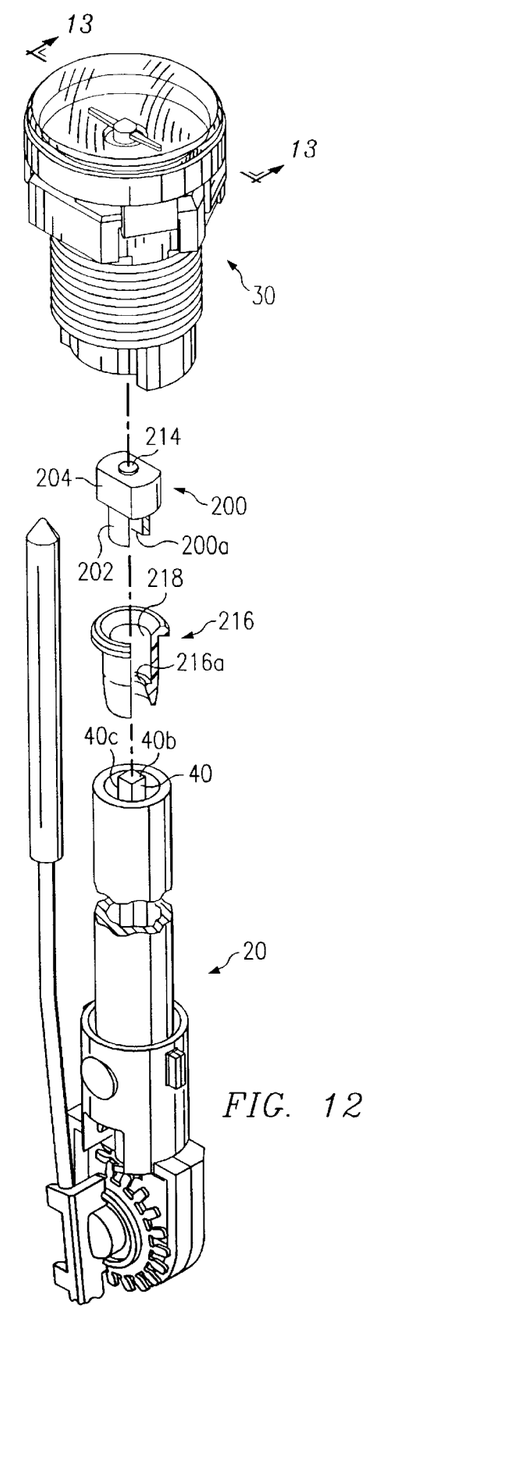
FIG. 12 is an exploded, broken, partial cutaway view of the single piece molded magnetic cap mounted to the gear assembly with alignment feature of FIG. 1.

The body portion 202 of the molded magnetic cap 200 is formed defining a longitudinal bore 210 substantially centrally disposed. The shape of the longitudinal bore 210 is formed to correspond to the shape of a second end 40b of a drive shaft 40, having at least one engaging edge 40c. According to the preferred embodiment shown in FIGS. 11A–11D, an engaging groove 212 corresponding to the engaging edge 40c of the drive shaft 40 is also defined in the body portion 202. When the drive shaft 40 is inserted into the bore 210, the engaging edge 40c of the drive shaft 40 engages the engaging groove 212 of the body portion 202 preventing the single piece magnetic cap 200 from rotating relative to the drive shaft 40. Alternately, the engaging edge can be a protrusion (not shown) extending either outward from the drive shaft or outward from the body portion into the bore space (not shown). Preferably, the engaging edge is provided as a result of the shape of the drive shaft, (e.g. as shown in FIGS. 11B and 12, where one of the corners of a multi-sided, e.g. square, rectangular, triangular, or other out of round cross-sectional shaped drive shaft, acts as an engaging edge). In a further alternate arrangement, the engaging edge could instead be a protrusion (not shown) extending from the body portion 202 into the bore space (not shown), and the second end 40b of the drive shaft 40 could be provided with a corresponding engaging groove (not shown) to accept the protrusion. In any event, when the protrusion or engaging edge is engaged with the engaging groove, the single piece magnetic cap is prevented from rotating about the drive shaft. Although prevented from rotating about the drive shaft 40, the magnetic cap 200 can float longitudinally (up and down) on the drive shaft 40.

Figure 13:
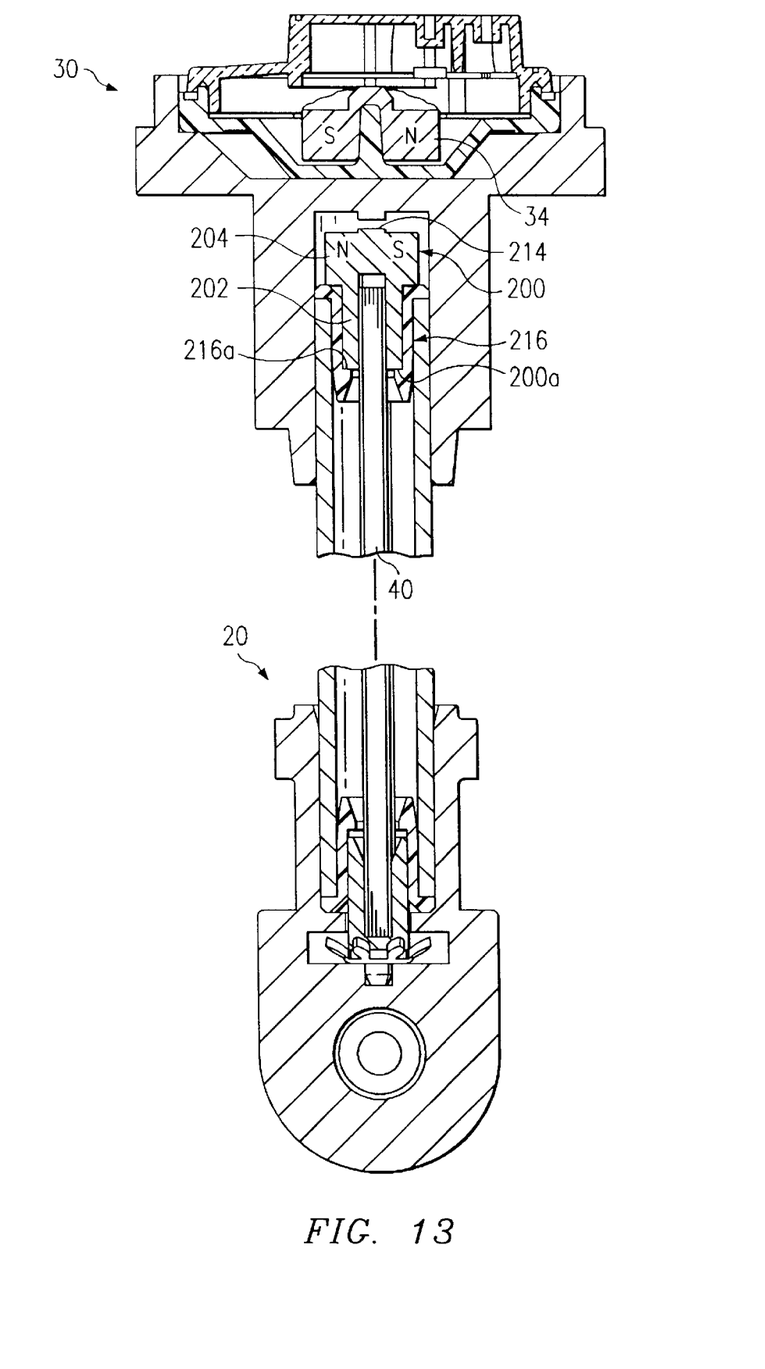
FIG. 13 is a cross-sectional broken view of the single piece molded magnetic cap mounted to a drive shaft of a gear assembly and assembled with an external magnetic dial taken along section line 13—13 of FIG. 12.
Figure 14A:
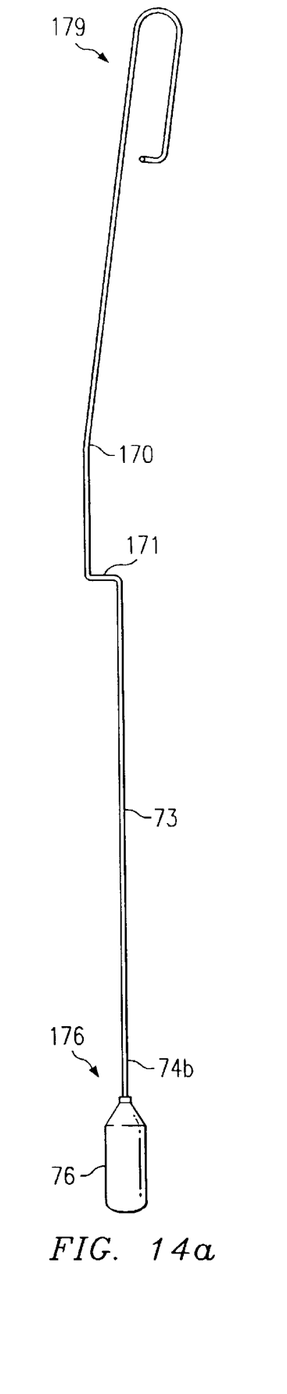
FIG. 14a is a side view of one exemplary embodiment of the float arm and counterweight system combination.
Figure 14B:
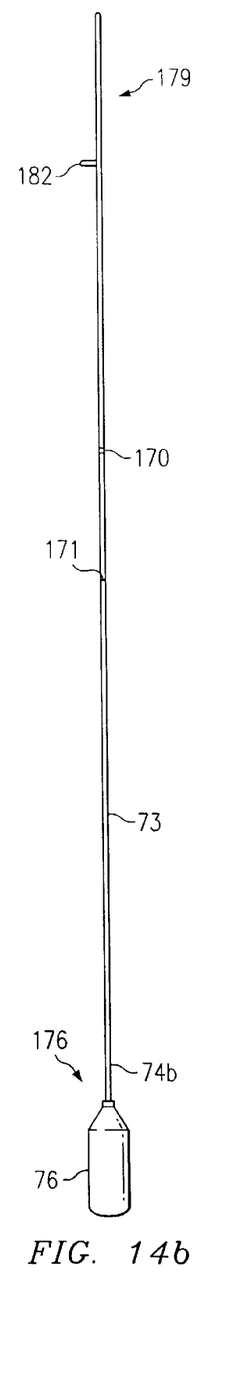
Figure 14C:
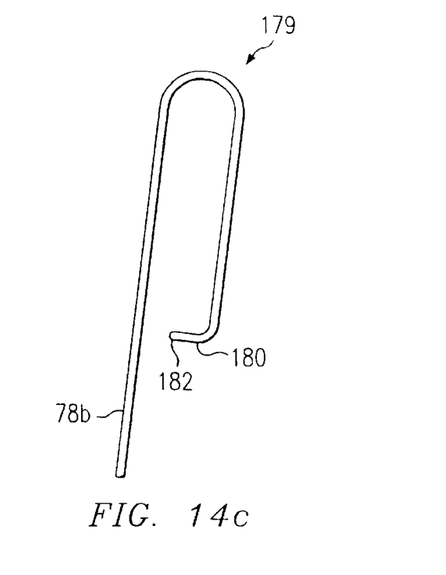
FIG. 14c is a broken side view of the counterweight portion of the one exemplary embodiment of the float arm and counterweight system combination shown in FIG. 14a in an unclasped state.
Figure 14D:
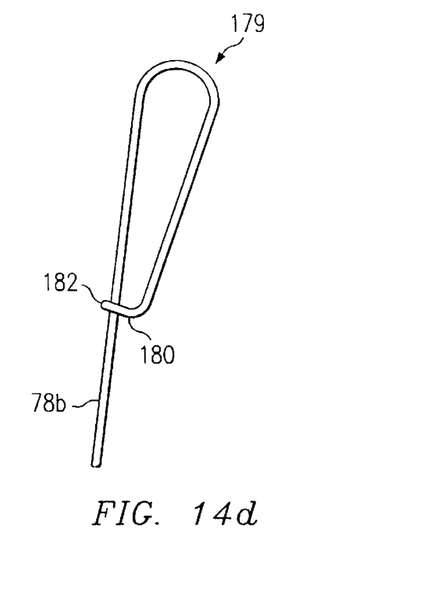
FIG. 14d is a broken side view of the counterweight portion of the one exemplary embodiment of the float arm and counterweight system combination shown in FIG. 14a in a clasped state.

Regardless of which piece they are on, the engaging edge or protrusion and the corresponding engaging groove described above also act as positioning features. When the engaging edge is positioned within the engaging groove, the magnetic cap (tank magnet) 200 is properly oriented and aligned with respect to the gauge dial magnet 34 of the gauge head 30 when the gauge head is ultimately installed. Preferably, as shown in FIGS. 1 and 12 and discussed above, the shaped (multi-sided) drive shaft 40 has a square or other non-circular cross-section having multiple edges, any of which could be an engaging edge depending on the particular bore configuration or depending on the particular gauge dial magnet used. Preferably, the bore 210 defined in the body portion 202 of the single piece magnetic cap 200 is similarly shaped, sized, and of sufficient depth such that the second end 40b of the shaped drive shaft 40 fits securely and easily within the bore 210 of the magnetic cap 200 and such that the engaging edge or edges on the drive shaft engage the engaging groove or grooves in the bore. The ability to secure the single piece magnetic cap 200 to a drive shaft 40 having an engaging edge 40c such that the magnetic cap 200 is precisely installed in only one or in only a limited number of orientations with respect to the drive shaft and such that the single piece magnetic cap 200 does not rotate out of alignment with the receiving magnet 34, greatly increases the precision, accuracy, and reliability of the measurement received from the gauge and greatly reduces time and cost required for proper assembly, alignment, and calibration of the tank magnet 200 with the gauge or receiving magnet 34. As shown in FIG. 13, the magnetic cap 200 rides within bushing 216 such that a bottom surface 200a of the magnetic cap 200 rests against a lip 216a projecting outward within a central bore 218 defined in the bushing. Further, as shown in FIGS. 11B and 13, the bearing portion 214, which projects upward from the magnetic portion 204, serves as an insulating contact portion of the single piece magnetic cap 200 with the gauge head 30 to prevent the magnetic portion 204 of the magnetic cap from contacting a lower surface of the gauge head and to prevent the magnetic cap from moving upwardly relative to the drive shaft.

In the preferred installation of the above described embodiment, the magnetic portion 204 is oriented with respect to the body portion 202 such that when the engaging edge 40c of the drive shaft 40 engages the engaging groove 212 of the molded magnetic cap 200, the magnetic poles of the molded magnetic cap properly align with the magnetic poles of the receiving magnet 34 in a dial assembly. No additional installation steps or adjustments need be made in order to provide an accurate correlation with the receiving magnet 34 on a dial gauge. The single piece structure of the molded magnetic cap 200 is adapted to replace the dual piece tank magnet 36 and the tank magnet holder 38 assembly disclosed in a previous embodiment thereby improving efficiency and accuracy in the installation and calibration process.

Preferably, the one piece molded magnetic cap 200 is formed by injection molding a nylon material filled with a ferrite powder. More preferably, the ferrite powder is a moldable or plastic ferrite powder having a particle size and shape small enough to be used as a filler. Most preferably, the ferrite powder is one of strontium ferrite or barium ferrite. However, a rare earth ferrous powder such as NdFeB or SmCo could alternately be used. Preferably, a nylon material is used as the sturdy base material; however, other materials having similar strength, durability, and molding properties could also be used. Preferably, the single piece magnetic cap is formed by an injection molding process, with specific magnetic fields being created in desirable portions of the magnetic portion 204 during the molding process. However it is possible that the single piece magnetic cap could be formed by other methods now known or later developed.

There has been described and illustrated herein an embodiment of a single piece molded magnetic cap for use with a gear assembly with alignment feature. While a particular embodiment of the invention has been described, it is not intended that the invention be limited thereto, as it is intended that the invention be a broad in scope as the art will allow and that the specification be read likewise. Thus, while a molded magnetic cap having a particular shape and configuration has been disclosed and illustrated, it will be appreciated by those skilled in the art that the molded magnetic cap can be of other shapes and configurations such that a magnetic portion is formed having a positive magnetic pole and a negative magnetic pole. Likewise, while the bore and the drive shaft have been illustrated and disclosed as being of a generally square shape, it will be appreciated by those skilled in the art that the bore could be formed to fit a drive shaft having another shape which would likewise serve to prevent the molded magnetic cap once installed from rotating on the drive shaft so long as the shape of the bore corresponds to the shape of the drive shaft in such as manner to allow the drive shaft to be secured within the bore of the molded magnetic cap. Further, it is understood that the gear assembly onto which the molded magnetic cap is presented above could be different so long as the drive shaft of the gear assembly is shaped such that the improved molded magnetic cap installs in one step and is prevented from rotating freely about the drive shaft. It will therefore be appreciated by those skilled in the art that yet other modifications could be made to the provided invention without deviating from the spirit and scope as claimed.

We claim:

1. A magnetic device for use with a gear assembly for a liquid level gauge comprising:
    a base portion, said base portion having a top end and a bottom end, said base portion defining a longitudinal bore through the bottom end of the base portion adapted to accept a drive shaft of a liquid level gauge such that the magnetic device moves as the drive shaft moves;
    a magnetic head portion integrally formed with said base portion, said magnetic head portion positioned at the top end of the base portion,
    wherein said drive shaft and said bore are shaped such that said drive shaft securely fits within said bore and such that once said magnetic device is installed on the drive shaft, said magnetic device does not rotate about the drive shaft.

2. An apparatus for use with a liquid level gauge, said liquid level gauge having a magnetic dial member, said apparatus comprising:
    a first section and a second section,
    said first section comprising:
        a pinion gear, said pinion gear having pinion gear teeth and a pinion gear neck; said pinion gear neck defining a shaped passageway to accommodate a similarly shaped drive shaft, said shaped drive shaft having a positioning feature that determines the positioning of the drive shaft within the shaped passageway;
        a second gear, said second gear having an engaging means and a gear housing, said gear housing having a first portion for receiving said pinion gear and a second portion for receiving said second gear, said first portion of said gear housing defining a first portion passageway for insertion of an appendage, said first portion passageway including a recess to insert said pinion gear neck into said first portion passageway, said second portion of said gear housing defining a slot for free rotation of said pinion gear teeth, said slot operatively adjacent to said recess, said second gear rotatably connected to said second portion of said gear housing so that said second gear engaging means mesh with said pinion gear teeth, said second gear held into proper rotational alignment by a retention member;
    said second section comprising:
        a drive shaft having a positioning member, said drive shaft being operable by said first section; and
        a single-piece magnetic device having a base portion and a top portion integrally formed, said top portion having a positively charged end and a negatively charged end, said base portion defining a longitudinal bore therethrough, wherein said drive shaft is adapted to fit within the longitudinal bore of said magnetic device such that the positioning member of the drive shaft engages a corresponding portion of said longitudinal bore of said magnetic device in a manner preventing said magnetic device from rotating about said drive shaft.

3. An apparatus according to claim 2, wherein said second gear further comprises a second gear nose, said second gear nose protruding away from said second gear engaging means, and wherein said magnetic device is adapted to be installed on said drive shaft in a predetermined polar arrangement.

4. An apparatus according to claim 3, wherein said second portion of said gear housing defines a second gear receiving passage to receive said second gear nose.

5. An apparatus according to claim 2, wherein said second portion of said gear housing further comprises a second portion nose protruding from said second portion of said gear housing.

6. An apparatus according to claim 7, wherein said second gear further defines an opening to receive said second portion nose protruding from said second portion of said gear housing.

7. An apparatus according to claim 2, wherein said second gear is adapted for use as part of a pivot arm assembly;
    said pivot arm assembly comprising said second gear and an arm attachment portion, said arm attachment portion having at least one fastening element for securely connecting a float arm to said arm attachment portion.

8. An apparatus according to claim 2, wherein said pinion gear neck is longer than said recess in said first portion passageway so as to further secure said pinion gear in said first portion of said gear housing.

9. An apparatus according to claim 2, wherein said apparatus further comprises a bushing for securing vertical alignment of said pinion gear neck in said first portion passageway of said gear housing, said bushing disposed in said first portion passageway of said gear housing.

10. An apparatus according to claim 2, wherein said second gear further comprises a protruding stop adapted to fit within a keyway defined in said second portion of said gear housing such that the range of motion of the second gear relative to the gear housing is restricted to a predetermined arc.

11. An apparatus according to claim 2, wherein said drive shaft further comprises a second drive shaft defining a passageway for insertion of said first drive shaft, thus allowing for a variable length drive shaft.

12. A magnetic drive shaft assembly comprising:
    a drive shaft having a first end and a second end, said second end having a positioning feature for orienting said drive shaft;
    a pinion gear;
    said pinion gear comprising pinion gear teeth and a pinion gear neck;
    said pinion gear neck containing a shaped passageway to receive the first end of said drive shaft, said passageway shaped in such a way as to cooperate with said positioning feature of said drive shaft; and
    a single piece magnet having a base portion and a head portion which are integrally formed, said head portion having a polar magnetic charge such that one end of said head portion has a positive charge and the other end of said head portion has a negative charge, said base portion having a bottom end and a top end and defining a longitudinal bore through said bottom end, said bore being formed to substantially conform to the shape of the second end of the drive shaft, said base portion further defining a corresponding positioning feature to said positioning feature of said drive shaft,
    wherein when said single piece magnet is attached to a second end of said drive shaft, said positioning feature of said drive shaft engages said positioning feature of said single piece magnet.

13. A magnet drive shaft assembly according to claim 12, wherein said drive shaft further comprises a second drive shaft defining a passageway for insertion of first drive shaft, thus creating a drive shaft of varying length.

14. An apparatus for use with a liquid level gauge, said liquid level gauge having a magnetic dial member, said apparatus comprising: a first section and a second section, said first section comprising:
- a pinion gear, said pinion gear having pinion gear teeth and a pinion gear neck: said pinion gear neck defining a shaped passageway to accommodate a similarly shaped drive shaft, said shaped drive shaft having a positioning feature that determines the positioning of the drive shaft within the shaped passageway;
- a second gear, said second gear having an engaging means and a gear housing, said gear housing having a first portion for receiving said pinion gear and a second portion for receiving said second gear, said first portion of said gear housing defining a first portion passageway for insertion of an appendage, said first portion passageway including a recess to insert said pinion gear neck into said first portion passageway, said second portion of said gear housing defining a slot for free rotation of said pinion gear teeth, said slot operatively adjacent to said recess, said second gear rotatably connected to said second portion of said gear housing so that said second gear engaging means mesh with said pinion gear teeth, said second gear held into proper rotational alignment by a retention member;

said second section comprising:
- a drive shaft having a positioning member, said drive shaft being operable by said first section:
  - a single-piece magnetic device having a base portion and a top portion integrally formed, said top portion having a positively charged end and a negatively charged end, said base portion defining a longitudinal bore at least partially therethrough, wherein said drive shaft is adapted to fit within the bore of the single-piece magnetic device such that the positioning member of the drive shaft engages a corresponding portion of the bore of the single-piece magnetic device in a manner preventing the single-piece magnetic device from rotating about the drive shaft and such that the magnetic device is properly aligned with the magnetic dial member; and
  - a float arm assembly coupled to and pivotal with said second gear, said float arm assembly comprising a shaft having a first end and a second end, wherein a float is attached to said first end and said second end is formed having at least one bend such that said second end of said float arm assembly functions as a counterweight.

15. An apparatus for use with a liquid level gauge, said liquid level gauge having a magnetic dial member, said apparatus comprising:
a first section and a second section,
said first section comprising:
- a pinion gear, said pinion gear having pinion gear teeth and a pinion gear neck; said pinion gear neck defining a shaped passageway to accommodate a similarly draped drive shaft, said shaped drive shaft having a positioning feature that determines the positioning of the drive shaft within the shaped passageway;
- a second gear, said second gear having an engaging means and a gear housing, said gear housing having a first portion for receiving said pinion gear and a second portion for receiving said second gear, said first portion of said gear housing defining a first portion passageway for insertion of an appendage, said first portion passageway including, a recess to insert said pinion gear neck into said first portion passageway, said second portion of said gear housing defining a slot for free rotation of said pinion gear teeth, said slot operatively adjacent to said recess, said second gear rotatably connected to said second portion of said gear housing so that said second gear engaging means mesh with said pinion gear teeth, said second gear held into proper rotational alignment by a retention member;

said second section comprising:
- a drive shaft having a positioning member, said drive shaft being operable by said first section;
- a single-piece magnetic device having a base portion and a top portion integrally formed, said top portion having a positively charged end and a negatively charged end, said hale portion defining a longitudinal bore at least partially therethrough, wherein said drive shaft is adapted to fit within the longitudinal bore of the magnetic device such that the positioning member of the drive shaft engages a corresponding portion of the bore of the magnetic device in a manner preventing the magnetic device from rotating about the drive shaft and such that the magnetic device is properly aligned with the magnetic dial member; and
- a float arm assembly coupled to and pivotal with said second gear, said float arm assembly comprising a shaft having a first end and a second end, wherein a float is attached to said first end and said second end is formed having at least one bend such that said second end of said float arm assembly functions as a counterweight.

16. An apparatus for use with a liquid level gauge as claimed in claim 15, wherein said bend further wraps around a portion of said shaft of said float arm assembly.

17. An apparatus for use with a liquid level gauge as claimed in claim 15, wherein said bend spirals about a portion of said shaft of said float arm assembly.

18. A magnetic device as claimed in claim 1, wherein said magnetic device is a magnetic cap.

19. A magnetic device as claimed in claim 2, wherein said magnetic device is a magnetic cap.

* * * * *

UNITED STATES PATENT AND TRADEMARK OFFICE
CERTIFICATE OF CORRECTION

PATENT NO. : 6,675,648 B2
APPLICATION NO. : 10/211806
DATED : January 13, 2004
INVENTOR(S) : Housey et al.

It is certified that error appears in the above-identified patent and that said Letters Patent is hereby corrected as shown below:

Column 1:
Line 25, delete "a", and insert --an--.

Column 3:
Line 20, after "When", insert --the--.
Line 45, after "head", insert --.--.

Column 4:
Line 41, delete "referenced", and insert --reference--.
Line 62, after "74", insert --.--.
Line 65, after "70", insert --.--.

Column 5:
Line 30, after "66", delete ",".

Column 6:
Line 46, after "70", delete ",".

Column 7:
Line 40, delete "know", and insert --known--.

Column 9:
Line 3, after "well", insert -- --.
Line 23, after "e.g.", insert --,--.
Line 25, after "e.g.", insert --,--.

Column 10:
Line 10, delete "above described", and insert --above-described--,
Line 40, after "However", insert --,--.

Column 12:
Line 10 (claim 6, line 1), delete "7", and insert --2--.

UNITED STATES PATENT AND TRADEMARK OFFICE
CERTIFICATE OF CORRECTION

PATENT NO. : 6,675,648 B2
APPLICATION NO. : 10/211806
DATED : January 13, 2004
INVENTOR(S) : Housey et al.

It is certified that error appears in the above-identified patent and that said Letters Patent is hereby corrected as shown below:

<u>Column 14</u>:
Line 4 (claim 15, line 9), delete "draped", and insert --shaped--.
Line 28 (claim 15, line 32), delete "hale", and insert --base--.

Signed and Sealed this

Tenth Day of October, 2006

JON W. DUDAS
*Director of the United States Patent and Trademark Office*